(No Model.)
J. J. WADE.
BASIN, WASTE, OVERFLOW, AND TRAP FITTING.
No. 418,831. Patented Jan. 7, 1890.
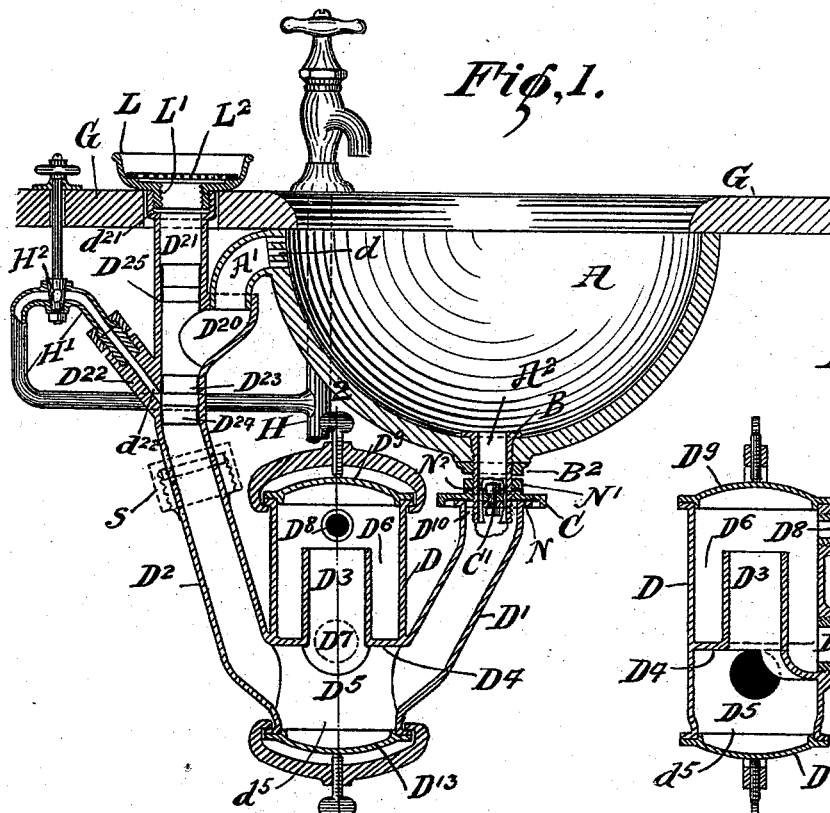
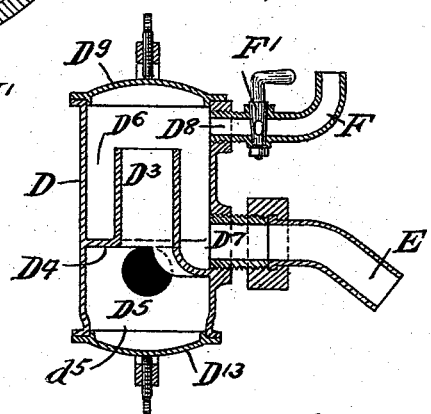
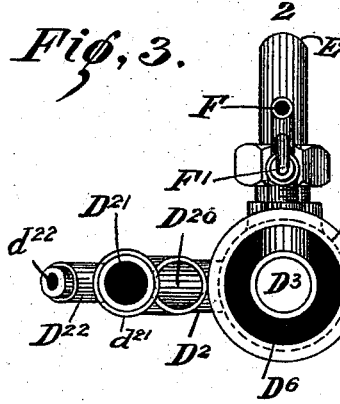
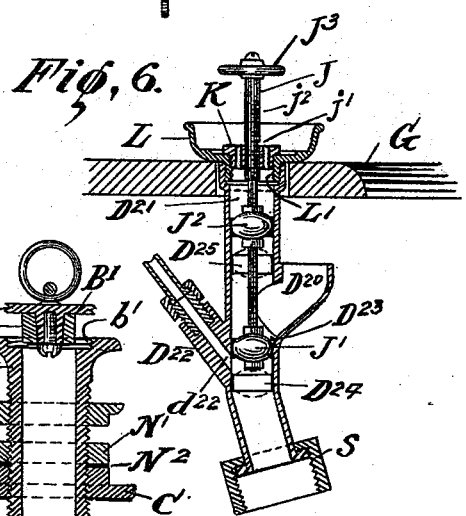
Witnesses
Jane Elliott.
John R. Pettenstrom
Inventor
Jas. J. Wade
By his Attorneys
Burton and Burton

UNITED STATES PATENT OFFICE.

JAMES J. WADE, OF CHICAGO, ILLINOIS.

BASIN, WASTE, OVERFLOW, AND TRAP FITTING.

SPECIFICATION forming part of Letters Patent No. 418,831, dated January 7, 1890.

Application filed March 22, 1889. Serial No. 304,313. (No model.)

*To all whom it may concern:*

Be it known that I, JAMES J. WADE, a citizen of the United States, residing at Chicago, county of Cook, and State of Illinois, have invented certain new and useful Improvements in Basin, Waste, Overflow, and Trap Fittings, which are fully set forth in the following specification, reference being had to the accompanying drawings, forming a part thereof.

In the drawings, Figure 1 is a vertical medial section through the basin and my fitting attached thereto. Fig. 2 is a section at the line 2 2 on Fig. 1. Fig. 3 is a plan of the fitting detached from the basin and having certain parts removed to show the interior. Fig. 4 is a detail plan of a disk which forms part of the device for connecting the fitting to the center of the bowl. Fig. 5 is a sectional detail of a modified form of tail-piece and stopper for the basin-outlet. Fig. 6 is a detail vertical section through the upper portion of the overflow-pipe, showing that portion separable and a stem having valves or stoppers inserted therein, said valves being shown in full lines in the position occupied when forcing water through the overflow and trap, and being shown in dotted line in the position occupied when forcing the water back through the entrance of the overflow into the bowl to cleanse that portion of the overflow.

A is the bowl, which is of ordinary form, having the overflow-horn A' and the bottom discharge-opening $A^2$.

B is the tail-piece, containing the usual strainer and adapted to receive the stopper B', and clamped to the bowl at the bottom outlet in the usual manner by the clamp-nut $B^2$. This tail-piece is elongated and exteriorly threaded for a purpose which will appear.

C is the disk or plate having a central opening interiorly threaded to receive the threaded end of the tail-piece B.

The waste, overflow, and trap fitting is one piece comprising the trap D, direct waste-pipe D', an overflow waste-pipe $D^2$. The trap comprises the central pipe or duct $D^3$, which extends up from a diaphragm $D^4$, below which is the chamber $D^5$, into which the direct waste-pipe and overflow-pipes discharge, the central pipe $D^3$ leading out from the top of said chamber and opening within the trap-shell below the top, leaving the annular chamber or passage $D^6$, the bottom of which is formed by the diaphragm $D^4$. From this annular chamber or passage the final waste discharge-opening $D^7$ leads to the final waste-pipe E. From the upper part of the annular chamber, above the upper end of the interior pipe $D^3$, an opening $D^8$ leads to the ventilating-pipe F. The overflow-pipe $D^2$ is provided at the upper end with two terminations $D^{20}$, by which it is adapted to connect with the usual overflow-horn A' of the bowl, and $D^{21}$, which extends up outside the bowl to the top of the slab G, through which it opens upwardly. Into the overflow-pipe, below the point where the same branches to form the two terminations $D^{20}$ and $D^{21}$, a water-jet is introduced through the aperture $d^{22}$, formed through the boss $D^{22}$, to which the branch H' of the water-supply pipe H is connected. The upper end of the branch $D^{21}$ is slightly enlarged to form a hub $d^{21}$, which is interiorly threaded. Into this hub is screwed the soap-cup L, which has the central bottom opening through the boss L', the exterior of which boss is threaded and screwed into the hub $d^{21}$, so that the soap-cup constitutes a wide mouth for the overflow branch $D^{21}$. The soap rack or strainer $L^2$ constitutes a false bottom for the soap-cup over the open end of the overflow branch. This strainer $L^2$ may be removed when it is desired to make use of the valves hereinafter described, and it may be omitted altogether, the perforated collar K, hereinafter described, performing the same office as a strainer. Preferably and for a purpose hereinafter explained the pipe $D^{21}$, just above the aperture $d^{22}$, is provided with a valve-seat $D^{23}$, which is preferably cylindrical, a slight boss being formed on the interior of the pipe, and bored out by a tool inserted from the upper end of the branch $D^{21}$. A similar valve-seat $D^{24}$ may be formed just below the aperture $d^{22}$, and another similar valve-seat $D^{25}$ may be formed in the branch $D^{21}$, just above the junction therewith of the branch $D^{20}$. A valve-stem J is provided with two valves or stoppers J' and J², rigidly secured on the stem at such distance apart that when one is seated in the valve-seat D²⁴ the other will be seated in the seat D²⁵. These valve-seats are all of equal diameter, and the valves J' and J² are likewise of equal diameter. The upper portion of the valve-stem J is threaded, and a perforated collar K is screwed into it, a handle J³ being attached to the stem above the collar after the latter is put into the stem. This collar is peripherally threaded to fit the interior of the boss L' of the soap-cup, which is interiorly threaded to receive it. It may be always present, or it may remain on the valve-stem and be inserted only when the valves are to be used. If employed as the ordinary strainer for the soap-cup, it will be removed when it is desired to use the valves, (or, if the strainer or soap-rack L² is employed, that will be removed from the soap-cup,) the perforated collar being then put onto the valve-stem, (or being already thereon, if it has not been employed as the strainer,) the valves will be inserted down through the bottom of the soap-cup and into the branch D²¹, until the lower valve J' stands in whichever seat it is desired to have it occupy, according to the purpose to be accomplished, as hereinafter explained, and the collar K is then screwed down on the valve-stem and into the bottom of the soap-cup, thereby securing the valve in its seat and permitting it to be screwed down as far into the seat as desired or into the other seat provided for it. In order that the operator may know where the valve stands and when it is on one seat or the other, the stem is notched at two points $j'$ $j²$. When the notch $j'$ coincides with the top of the cap-plate, the latter being screwed down into the boss L', as illustrated, the valve is in the upper seat D²³, and when the notch $j²$ coincides in like manner with the top of the cap-plate, the valve is in the lower seat D²⁴. Obviously the collar K may be considered as secured to the upper end of the branch D²¹, the presence or absence of the soap-cup being immaterial, so far as the operation of the valves is concerned; but the construction illustrated is convenient, permitting the soap-cup to remain in place, and requiring only the removal of its false bottom in order to insert the valves when they are to be used. One advantage of this construction is that access is obtained to the overflow-passage, and thence to the trap into which it discharges, directly from the top of the slab, and the fitting is adapted to be applied to the common form of basin having the overflow-horn formed on it, thus making it possible to give to these common forms of basins this advantage of accessibility to the overflow. This result is dependent upon and obtained by the form of the upper end of the overflow-pipe described, wherein it is made to consist of two branches D²⁰ and D²¹, one of which receives the overflow-horn and the other of which extends to the top of the slab. The introduction into the overflow-pipe of the water-jet through the aperture $d²²$ renders it possible to flush out the overflow instantaneously by opening the valve H², which controls the access of water through said aperture. In case any obstruction has caused a complete or nearly complete stoppage of the waste-pipe, so that the water admitted through the aperture $d²²$ cannot flow out, it is evident, in the absence of any valves or stoppers in the overflow, that the head of water that could be obtained to force out the obstruction would be limited to the height of upper margin of the bowl. In order to make available for such purpose the whole, or so much as may be desired, of the supply-pressure, I have provided the valves J' and J² on the stem J, adapted to seat in the overflow-pipe. When the obstruction exists beyond the aperture $d²²$, either in the overflow-passage or in the trap, the stem is inserted until the valve J' closes the seat D²³. In this position it cuts off the branches D²⁰ and D²¹, completely stopping the pipe above the aperture $d²²$, and when the water is admitted through that aperture its total pressure is obtained upon the obstruction in pipe or trap until such obstruction is forced out. When there is any obstruction above the aperture $d²²$, either in the horn or in the branch D²⁰, or even in the perforations leading from the bowl into the horn, the valve-stem J will be depressed until its valve J' is in the seat D²⁴ and the valve J² is, as it will then be, in the seat D²⁵. The water being now admitted through the aperture $d²²$ is confined between the valves J' and J² and forced to pass into the branch D²⁰ and back through the perforations $d$ into the bowl, cleaning out any obstruction which exists in that course. The pipes being thus cleared, the collar K will be unscrewed and the stem and its valves and said plate will be withdrawn, and the strainer L² or the collar K restored to its place in the soap-cup. An advantage of the branch D²¹, in addition to the fact that it allows access to the overflow for the purpose of cleansing, is that it affords means, as illustrated, for draining the soap-cup into the waste, thereby preventing the uncleanly appearance usually observed in soap-dishes or stationary stands.

In order that this fitting may be attached to any basin, notwithstanding the slight variation which will be found to exist in the dimensions of different basins, I adopt the features of construction which will now be explained. The tail-piece B is of greater length than would be necessary or than is customary for such parts when an ordinary waste-pipe connection is to be made thereto. The upper end of the waste-pipe D' is expanded in the direction of the trap D and the overflow-pipe D², making it oval in horizontal outline, the longer axis of the oval being in a plane which, produced, would cut the overflow-pipe D². The disk C, which is screwed onto the tail-piece B, is connected to the upper expanded end $D^{10}$ of the waste-pipe by means of the two bolts C' C', the holes for said bolts in said disk C being elongated in the direction of the longer axis of the expanded mouth $D^{10}$. Around said expanded mouth—that is to say, at the upper margin of the pipe D'—there is formed a broad flange $D^{11}$, through which are formed the holes $d^{11}$ for the clamping-bolts C'. Suitable water-tight packing N is interposed between the flange and the disk, and to prevent any leakage through the thread on the flange, which is screwed into the disk, a jam-nut N' may be provided, which will be rendered water-tight on the threaded tail-piece by white lead or in any other customary manner, and a packing, washer, or lead gasket $N^2$ may be interposed between said jam-nut and the hub of the disk C.

This fitting is designed to be made so that when the disk C is placed with its opening into which the tail-piece is screwed over the middle of the expanded mouth $D^{10}$ of the waste-pipe, and the tail-piece is screwed down into said disk to about half the extent that is possible, the fitting will conform to the most usual dimensions of the basin for which it is designed in respect both to the height and to the lateral extent—that is, the distance laterally from the center of the bottom outline to the center of the overflow-horn. In order to adjust it to basins which vary from these dimensions, the disk C may be screwed up or down on the tail-piece, thereby raising or lowering the entire fitting to adapt it to a different vertical dimension and the bolts C' being slackened the fitting may be caused to slide laterally either way, the limit being the amount of the lateral expansion of mouth $D^{10}$ to adjust it to a different lateral dimension from that which is chosen as the standard or average.

The entire bottom of the chamber $D^5$ is formed by the hand-plate $D^{13}$, which being removed gives access not only to said chamber, but directly to the waste and overflow passages D' and $D^2$, which lead into said chamber so directly that they can be swabbed out through the hand-hole $d^5$. In like manner the top of the chamber or passage $D^6$ is formed by the cap-plate $D^9$, which being removed permits unobstructed access to the whole area of said chamber as well as to the interior pipe $D^3$, to which, it will be noticed, access is also obtainable from the bottom of the fitting when the plate $D^{13}$ is removed. It will be noticed that the waste-discharge aperture $D^7$ is at the extreme bottom of the chamber $D^6$, and I find that the fall of the water over the upper end of the tube $D^3$ in all ordinary cases washes all the sediment out into the waste-pipe; but where any accumulates or when it is of such a nature that it cannot be washed out, as when it consists of fibrous material which might become wound around the duct $D^3$, the access obtainable through the top by removing the cap-plate $D^9$ is so complete and direct that it is very easy to remove the obstruction.

In order to utilize the supply-jet which may be introduced through the aperture $d^{22}$ in the overflow-pipe to force out any obstruction which may exist in the waste-pipe beyond the trap, it is necessary that all openings back of the trap be closed, and to this end I preferably make the tail-piece B as shown in Fig. 5, having its upper interior margin rabbeted and threaded at b'. The stopper B' is then made with a flange $b^2$ at the top, peripherally threaded and adapted to be screwed into the rabbeted and threaded upper end of the tail-piece B. The portion $B^{20}$ of the stopper fits, as usual, into the bore of the tail-piece below the rabbet b', and in ordinary use is only inserted far enough to seat in the tail-piece; but when it is desired to force out the waste-pipe beyond the trap the stopper will be pushed down so that the flange $b^2$ may be screwed into the rabbet in the tail-piece and the stopper thus secured therein, so that it will resist even the supply-pressure when the same is turned on through the overflow.

If the ventilating-pipe is not adapted to serve as a stand-pipe for water, or is not so adapted to a sufficient height to afford the necessary pressure, such vent-pipe should also be shut off, and for that purpose the valve F' is provided in such ventilating-pipe.

An important advantage of the described means of closing off both the overflow and the ordinary waste passages from the bowl by positive means which will resist the supply-pressure consists in the possibility thus afforded of preventing the entrance of sewer-gas through the fixture, when, for any reason, the trap is dry. This, as is well known, occurs commonly by reason of the evaporation of the water from the trap when the fixture stands for a long time unused, as in vacant rooms or houses supplied with such fixtures. Under such circumstances—that is to say, when a fixture is to remain or may remain for a length of time unused—it is only necessary to screw in the stopper B' into the bowl-outlet, and to insert the valve J' down into its seat $D^{24}$ and secure it therein suitably, as described, by means of the collar K. This fixture is applicable to baths and sinks as well as to hand-basins, any changes requisite being mere matters of proportion and dimension.

The branched overflow-pipe may be employed in connection with any other form of trap, and for that purpose may be made detachable from the remainder of the fitting, as illustrated by the dotted outlines in Fig. 1, wherein S represents a coupling by which the branched overflow might be connected to the remainder of the fitting in case it were a separate piece.

I claim—

1. In combination with a basin having a bottom outlet and a direct waste-passage leading downwardly therefrom, and an overflow-horn projecting downwardly from the upper part of said basin, an overflow-pipe fitting separable from the basin and having an upwardly-open mouth for connection with the overflow-horn, and making junction also with the direct passage from the bottom outlet, whereby such fitting may be applied to the bowl and caused to make connection both with the downwardly-leading waste-passage and the downwardly-projecting overflow-horn, said fitting having a branch leading upwardly above the level of the upper margin of the bowl, the junction of such branch with the overflow-passage being between the overflow-horn connection and the waste-passage connection, substantially as set forth.

2. In combination with the basin having a bottom outlet and a waste-duct leading therefrom, an overflow-passage from the bowl making junction with the waste-passage from the bottom outlet, and having a supply-water-induction aperture between the overflow-oulet of the bowl and the junction of said overflow-passage with the waste-passage, and a water-supply pipe connected to said overflow-passage at such aperture to discharge supply-water into the overflow-passage for the purpose of forcing the contents thereof out into the final waste-passage, substantially as set forth.

3. In combination with the basin having a bottom outlet and a waste-duct leading therefrom, an overflow-passage from the bowl making junction with such waste-passage and having a supply-water-induction aperture between the overflow-outlet of the bowl and the junction of the overflow-passage with the waste-passage, and a water-supply pipe connected to said overflow-passage at such aperture and having a valve-seat between said water-induction aperture and the overflow-outlet of the bowl, and a valve adapted to seat therein, whereby the supply water-pressure may be brought to bear upon the contents of the overflow-passage to eject the same out into the final waste, substantially as set forth.

4. In combination with a basin having a bottom outlet and a waste-passage leading therefrom, and an overflow-pipe making junction with such waste-passage and having a water-supply-induction aperture and a water-supply pipe connected thereto between the overflow-outlet of the bowl and the junction of the overflow-passage with the waste, and having a valve-seat between said water-supply-induction aperture and the junction of the overflow-passage with the waste, and a valve adapted to seat therein, whereby the water may be forced through the overflow back toward and into the bowl regardless of the bottom outlet being closed or open, substantially as set forth.

5. In combination with the bowl, the pipe leading therefrom having two branches, one of which communicates with the overflow-horn and the other of which extends and is open upwardly, said overflow-pipe having a supply-water-induction aperture and a water-supply pipe connected thereto, and having a valve-seat beyond said aperture, and a vale-seat in the upwardly-open branch above the junction therewith of the branch which communicates with the horn, and a valve-stem having two valves rigid therewith at such distance apart as to seat, respectively, in the two valve-seats mentioned, whereby the water may be confined between said valves and discharge through the overflow-passage back into the bowl, substantially as set forth.

6. In combination with a basin having an ordinary waste-outlet and an overflow-outlet, pipes leading therefrom discharging finally into a common waste-pipe, a stopper for the waste-outlet of the bowl adapted to be positively secured in said outlet, a supply-pipe discharging into the overflow-pipe between the overflow-outlet of the bowl and the junction of the overflow-passage with the waste, and a valve in the overflow-pipe between said water-supply pipe and the overflow-connection with the bowl, adapted to positively cut off communication through said overflow-pipe into the bowl, whereby water under pressure may be introduced into the overflow-pipe to force out obstructions in said overflow or in the final waste-pipe beyond the junction of the overflow and direct waste-pipe, substantially as set forth.

7. In combination with the bowl, the direct waste, the overflow, the final waste into which the direct waste and the overflow both discharge, the trap which intervenes between said direct waste and overflow and the final waste, and a ventilating-pipe leading from said trap and provided with a valve to close the same at will, a stopper for the waste-outlet, adapted to be positively secured therein, a water-supply pipe communicating with the overflow, between the overflow-outlet of the bowl and the junction of the overflow with the direct waste, and a valve in the overflow between said water-supply pipe and the bowl, substantially as and for the purpose set forth.

8. In combination with the basin and the direct waste-pipe and the overflow-pipe therefrom, a trap comprising a chamber $D^5$, into which said waste-pipe and overflow-pipe discharge, a chamber above the chamber $D^5$, separated therefrom by a diaphragm, and a final waste-pipe leading from the bottom of said upper chamber, and the pipe $D^3$, opening downwardly through the diaphragm and upwardly in the upper chamber, substantially as set forth.

9. In combination with the basin, the direct waste-pipe and the overflow-pipe therefrom, the trap-fitting comprising the lower chamber $D^5$, into which said waste and overflow-pipes discharge at the side and with a downward inclination, and having a pipe $D^3$, leading upward from said chamber, the chamber $D^6$ above the chamber $D^5$ and into which the pipe $D^3$ discharges upwardly, and having the final waste-pipe leading from it at the bottom, the said chamber $D^5$ having a removable bottom and the chamber $D^6$ having a removable top plate, whereby direct and unobstructed access is obtained to all parts of said trap-fitting and to the direct waste and overflow pipes discharging into it through the two hand-holes, which are closed by the top and bottom plates, substantially as set forth.

10. In combination with the bowl, the overflow-pipe $D^{21}$, extending upwardly to the top of the slab and provided with the interiorly-threaded hub, the soap-cup having the exteriorly and interiorly threaded boss adapted to be screwed into said hub, and a removable strainer-bottom, and a valve adapted to seat in the overflow-pipe, and having its stem screwed through a threaded-collar K, said collar being exteriorly threaded also to fit the interiorly-threaded boss or soap-cup, whereby said valve and stem and collar are made interchangeable with the strainer-bottom of the soap-cup at will, substantially as set forth.

11. In combination with the bowl having the overflow-pipe $D^2$, having two branches, $D^{20}$ communicating directly with the overflow-horn of the bowl, and $D^{21}$ extending upwardly to the top of the slab, the soap-cup, and the perforated removable collar K, both secured at the upper end of the branch $D^{21}$, and the valve-stem screwed through said collar, provided below the collar with a valve which is adapted to seat in the overflow-pipe, whereby the valve and its stem are made removable and replaceable at will to permit the soap-cup to drain into the overflow or to permit the valve to be seated in the overflow, substantially as and for the purpose set forth.

12. In combination with the basin having a bottom outlet and a side overflow-horn, the trap-fitting comprising the trap and the overflow and direct waste pipes rigid therewith, the overflow-pipe having a mouth which joins onto the overflow-horn, the waste-pipe mouth being expanded in the direction of a vertical plane through the same and the overflow-pipe mouth, the disk C, adapted to be secured to the tail-piece of the waste-outlet of the bowl and to constitute a horizontal flange on such tail-piece, such disk being broader than the receiving-mouth of the waste-pipe in its expanded dimension by as much as the amount of such expansion or eccentricity, substantially as and for the purpose set forth.

13. In combination with the basin having the bottom outlet and the side overflow-horn, the trap-fitting comprising the trap and the overflow and the direct waste pipes rigid therewith, the overflow having a mouth adapted to be connected to the horn, the waste-pipe having a mouth adapted to receive the tail-piece at the waste-outlet, said waste-pipe mouth being elongated horizontally in the direction of a vertical plane through the same and the overflow-pipe mouth, the tail-piece elongated and exteriorly threaded, adapted to extend down within the waste-pipe mouth, the disk C, screwed onto the tail-piece and constituting a flange thereon, and being horizontally as much broader in the direction of the elongation of the mouth than said mouth in said elongated dimension as the amount of said elongation, whereby the trap-fitting may be adapted for connection with basins differing in respect to the distance horizontally between the vertical lines of their waste-outlet and overflow-horns, and also in respect to the distance between the horizontal planes of said waste-outlets and overflow-horns by the adjustment of said disk C on said tail-piece and on the waste-pipe mouth, substantially as set forth.

In testimony whereof I have set my hand, in the presence of two witnesses, this 16th day of March, 1889.

JAMES J. WADE.

Witnesses:
CHAS. S. BURTON,
JEAN ELLIOTT.